(12) United States Patent
Chiu et al.

(10) Patent No.: US 8,274,620 B2
(45) Date of Patent: Sep. 25, 2012

(54) LIQUID CRYSTAL DISPLAY PANEL AND ACTIVE DEVICE ARRAY SUBSTRATE THEREOF

(75) Inventors: Chun-Chang Chiu, Hsinchu (TW); Jia-Hung Huang, Hsinchu (TW); Wen-Ju Chen, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 0 days.

(21) Appl. No.: 13/282,433

(22) Filed: Oct. 26, 2011

(65) Prior Publication Data
US 2012/0038865 A1 Feb. 16, 2012

Related U.S. Application Data

(60) Continuation of application No. 13/026,308, filed on Feb. 14, 2011, now Pat. No. 8,115,885, which is a division of application No. 11/740,295, filed on Apr. 26, 2007, now Pat. No. 7,916,233.

(30) Foreign Application Priority Data

Nov. 3, 2006 (TW) .............................. 95140666 A

(51) Int. Cl.
*G02F 1/1333* (2006.01)
*G02F 1/1343* (2006.01)
*G02F 1/1335* (2006.01)
*H01L 29/04* (2006.01)

(52) U.S. Cl. ............ 349/48; 349/53; 349/104; 349/106; 349/122; 349/139; 257/59; 257/E29.003

(58) Field of Classification Search ............. 385/48, 385/53, 41, 42, 43, 104, 106, 108, 122, 138, 385/139, 140, 143, 144, 1; 174/260; 257/59, 257/E29.003
See application file for complete search history.

(56) References Cited

U.S. PATENT DOCUMENTS

| | | | | |
|---|---|---|---|---|
| 5,805,248 | A * | 9/1998 | Sakamoto et al. | 349/48 |
| 6,819,385 | B2 * | 11/2004 | Lu | 349/144 |
| 7,486,363 | B2 * | 2/2009 | Mori et al. | 349/141 |
| 7,796,223 | B2 * | 9/2010 | Baek et al. | 349/139 |
| 7,916,233 | B2 * | 3/2011 | Chiu et al. | 349/48 |
| 8,115,885 | B2 * | 2/2012 | Chiu et al. | 349/49 |
| 2004/0105058 | A1 * | 6/2004 | Lu | 349/114 |
| 2004/0246393 | A1 * | 12/2004 | Elliott et al. | 349/42 |
| 2006/0203172 | A1 * | 9/2006 | Baek et al. | 349/146 |
| 2008/0106665 | A1 * | 5/2008 | Chiu et al. | 349/48 |
| 2011/0134377 | A1 * | 6/2011 | Chiu et al. | 349/106 |

* cited by examiner

*Primary Examiner* — Brian Healy
(74) *Attorney, Agent, or Firm* — Jianq Chyun IP Office

(57) ABSTRACT

An active device array substrate including a substrate, a plurality of scan lines, a plurality of data lines, and a plurality of pixel units, each of the pixel units formed between every neighboring two of the scan lines and data lines is provided. Each of the pixel units includes a first active device, a first pixel electrode electrically connected to a corresponding scan line and a corresponding data line through the first active device, a second active device, a second pixel electrode electrically connected to a corresponding scan line and a corresponding data line through the first active device, a second active device and a second pixel electrode electrically connected to a corresponding scan line and a corresponding data line through the second active device. The first pixel electrode has a surface area different from that of the second pixel electrode.

3 Claims, 13 Drawing Sheets

LIQUID CRYSTAL DISPLAY PANEL AND ACTIVE DEVICE ARRAY SUBSTRATE THEREOF

CROSS-REFERENCE TO RELATED APPLICATION

This application is a continuation application of and claims the priority benefit of a U.S. application Ser. No. 13/026,308, filed on Feb. 14, 2011, now U.S. Pat. No. 8,115,885 which is a divisional application of U.S. application Ser. No. 11/740,295, filed on Apr. 26, 2007, U.S. Pat. No. 7,916,233. The U.S. application Ser. No. 11/740,295 claims the priority benefit of Taiwan application serial no. 95140666, filed on Nov. 3, 2006. The entirety of each of the above-mentioned patent applications is hereby incorporated by reference herein and made a part of this specification.

BACKGROUND OF THE INVENTION

1. Field of the Invention

The present invention generally relates to a liquid crystal display (LCD) panel and an active device array substrate thereof, in particular, to a LCD panel for efficiently promoting displaying quality.

2. Description of Related Art

Generally, the optical displaying effect of the conventional vertically aligned mode LCD is achieved by means of electrically controlled birefringence. In other words, the optical displaying effect of the conventional vertically aligned mode LCD is caused by the phase retardation of lights. When the phase retardation changes with the applied voltages, the images vary in brightness or darkness.

For example, a multi-domain vertically aligned (MVA) LCD has a plurality of protrusions/slits on a color filter substrate or a thin film transistor (TFT) array substrate thereof. The protrusions or slits are configured for controlling liquid crystal molecules arranged in multi-directions, thus obtaining a plurality of domains. Such the MVA-LCD can display images with wide view angle. However, transmittance of the MVA-LCD varies as the viewing angle changes, thus causing gray levels of displayed images varied accordingly. In other words, a viewer will see images of different brightness, when viewing the MVA-LCD at different angles.

For a twisted nematic (TN) LCD, the arrangement of the liquid crystal molecules are asymmetrically such that the viewer will see images of different brightness or even gray level inversion when viewed at various viewing angles. As shown in FIG. 1, when a viewer sees the image at a viewing angle θ=0°, the transmittance decrease but the driving voltage increases. While the viewer sees the image at a viewing angle θ=45°, or 60°, the transmittance inversely increases in certain ranges, for example at the peak A shown in FIG. 1, as the driving voltage increases. The displaying quality is not good. Hence, there is a need for improvement in this area.

SUMMARY OF THE INVENTION

Accordingly, the present invention is directed to an active device array substrate in a single pixel unit of the active array substrate, wherein pixel electrodes thereof have different charging ratios.

The present invention is also directed to an active device array substrate having pixel electrodes of different areas in a single pixel unit.

The present invention is still directed to an LCD panel having an active device array substrate for obtaining better displaying quality than that of conventional LCD panels.

For achieving the aforementioned objects or others, the present invention provides an active device array substrate. The active array substrate includes a substrate, a plurality of scan lines, a plurality of data lines, and a plurality of pixel units. The scan lines, the data lines and the pixel units are disposed over the substrate. Each pixel unit is formed between every neighboring two of the scan lines and data lines and includes a first active device, a first pixel electrode, a first resistant device, a second active device, and a second pixel electrode. The first pixel electrode is electrically connected to a corresponding scan line and a corresponding data line through the first active device. The first resistant device is electrically connected between the first active e device and the first pixel electrode. The second pixel electrode is electrically connected to a corresponding scan line and a corresponding data line through the second active device.

According to an embodiment of the present invention, the foregoing active device array substrate further includes a second resistant device electrically connected between the second active device and the second pixel electrode.

According to an embodiment of the present invention, the foregoing active device array substrate further includes a shielding metal layer disposed under the second resistant device.

According to an embodiment of the present invention, the foregoing first resistant device and second resistant device comprise photosensitive materials.

According to an embodiment of the present invention, the foregoing first resistant device and second resistant device comprise amorphous silicon.

The present invention further provides an LCD panel including an above-described active device array substrate, an opposite substrate, and a liquid crystal layer. The opposite substrate is disposed over the active device array substrate, and the liquid crystal layer is disposed between the active device array substrate and the opposite substrate.

According to an embodiment of the present invention, the opposite substrate can be a color filter substrate.

The present invention further provides an active device array substrate including a substrate, a plurality of scan lines, a plurality of data lines, and a plurality of pixel units. The scan lines, the data lines, and the pixel units are disposed over the substrate. Each pixel unit is formed between every neighboring two of the scan lines and data lines and includes a first active device, a first pixel electrode, a second active device, and a second pixel electrode. The first pixel electrode is electrically connected to a corresponding scan line and a corresponding data line through the first active device. The second pixel electrode is electrically connected to a corresponding scan line and a corresponding data line through the second active device. The first pixel electrode has a surface area different from that of the second pixel electrode.

According to an embodiment of the present invention, the first electrode has an surface area of 0.2 to 0.8 times of that of the second pixel electrode.

The present invention further provides an LCD panel including the aforementioned active device array substrate having first pixel electrodes and second electrodes having different surface areas, an opposite substrate, and a liquid crystal layer. The opposite substrate is disposed over the active device array substrate, and the liquid crystal layer is disposed between the active device array substrate and the opposite substrate.

According to an embodiment of the present invention, the opposite substrate can be a color filter substrate.

The present invention further provides an active device array substrate including a substrate, a plurality of scan lines, a plurality of data lines, and a plurality of pixel units. The scan lines, the data lines and the pixel units are disposed over the substrate. Each pixel unit is formed between every neighboring two of the scan lines and data lines and includes a double drain active device, a first pixel electrode, a first resistant device, and a second pixel electrode. The double drain active device includes a first active device and a second active device. The first pixel electrode is electrically connected to a corresponding scan line and a corresponding data line through the first active device of the double drain active device. The first resistant device is electrically connected between the first active e device and the first pixel electrode. The second pixel electrode is electrically connected to a corresponding scan line and a corresponding data line through the second active device of the double drain active device.

The present invention further provides an LCD panel including an above-described active device array substrate, an opposite substrate, and a liquid crystal layer. The opposite substrate is disposed over the active device array substrate, and the liquid crystal layer is disposed between the active device array substrate and the opposite substrate.

The present invention further provides an active device array substrate including a substrate, a plurality of scan lines, a plurality of data lines, and a plurality of pixel units. The scan lines, the data lines, and the pixel units are disposed over the substrate. Each pixel unit is formed between every neighboring two of the scan lines and data lines and includes a double drain active device, a first pixel electrode, and a second pixel electrode. The double drain active device includes a first active device and a second active device. The first pixel electrode is electrically connected to a corresponding scan line and a corresponding data line through the first active device of the double drain active device. The second pixel electrode is electrically connected to a corresponding scan line and a corresponding data line through the second active device of the double drain active device. The first pixel electrode has a surface area different from that of the second pixel electrode.

The present invention further provides an LCD panel including the aforementioned active device array substrate having first pixel electrodes and second electrodes having different surface areas, an opposite substrate, and a liquid crystal layer. The opposite substrate is disposed over the active device array substrate, and the liquid crystal layer is disposed between the active device array substrate and the opposite substrate.

The first pixel electrode and the second electrode of the active device array substrate have different surface areas, or the substrate has a first resistant device electrically connected between the first active device and the first pixel electrode. In this way, in a single pixel unit, after being charged, the first pixel electrode and the second pixel electrode obtain different voltage levels. As such, liquid crystal molecules respectively corresponding to the first pixel electrode and the second pixel electrode are driven by different voltages, thus the transmittances thereof are accordingly different from each other. Therefore, different transmittances can compensate each other, thus the LCD panel of the present invention can efficiently reduce the problem of color shift.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
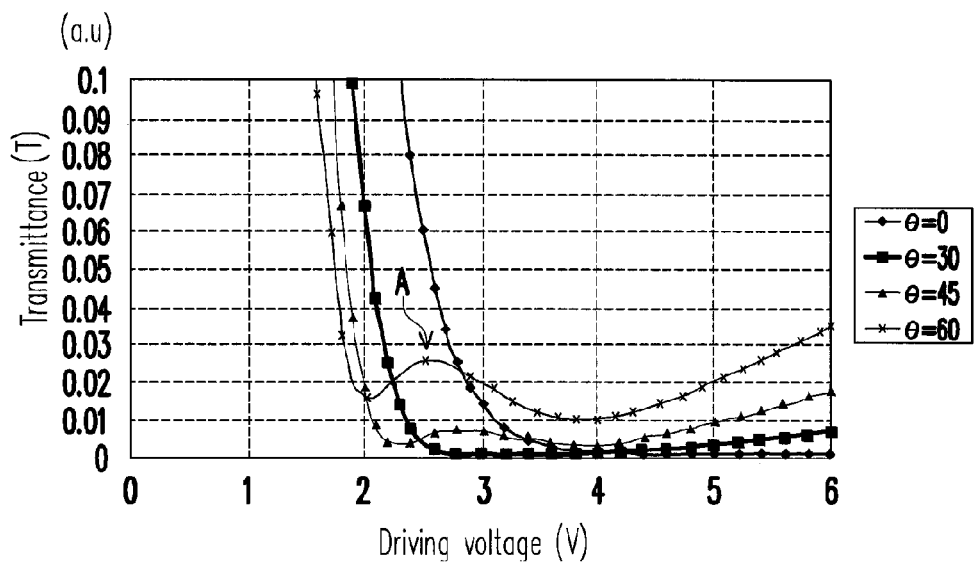
FIG. 1 is a schematic diagram of a conventional LCD illustrating a relationship between the driving voltage and the transmittance.

Reference will now be made in detail to the present preferred embodiments of the invention, examples of which are illustrated in the accompanying drawings. Wherever possible, the same reference numbers are used in the drawings and the description to refer to the same or like parts.

First Embodiment

Figure 2:
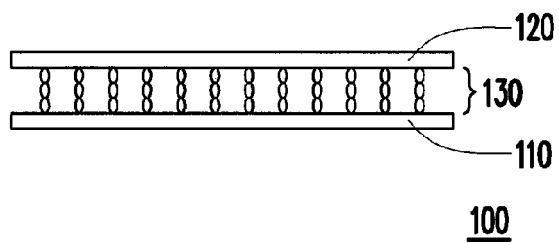
FIG. 2 is a schematic diagram for illustrating an LCD panel according to a first embodiment of the present invention.

FIG. 2 is a schematic diagram for illustrating an LCD panel according to a first embodiment of the present invention. Referring to FIG. 2, an LCD panel 100 according to the present invention includes an active device array substrate 110, an opposite substrate 120, and a liquid crystal layer 130. The liquid crystal layer 130 is disposed between the active device array substrate 110 and the opposite substrate 120. Generally, a backlight module (not shown) is often disposed under the LCD panel 100 that is usually not capable of emitting light by itself, for providing a plane light source thereto. The opposite substrate 120 is a color filter substrate. In such a way, the LCD panel can achieve the purpose of full color display. A twisted nematic (TN) LCD is exemplified herebelow to illustrate the LCD panel 100 of the first embodiment according to the present invention. However, it should be noted that the LCD panel 100 is not limited as a TN LCD. For example, the LCD panel 100 can also be of vertically aligned (VA) mode or in-plane switching (IPS) mode as well.

Figure 3A:
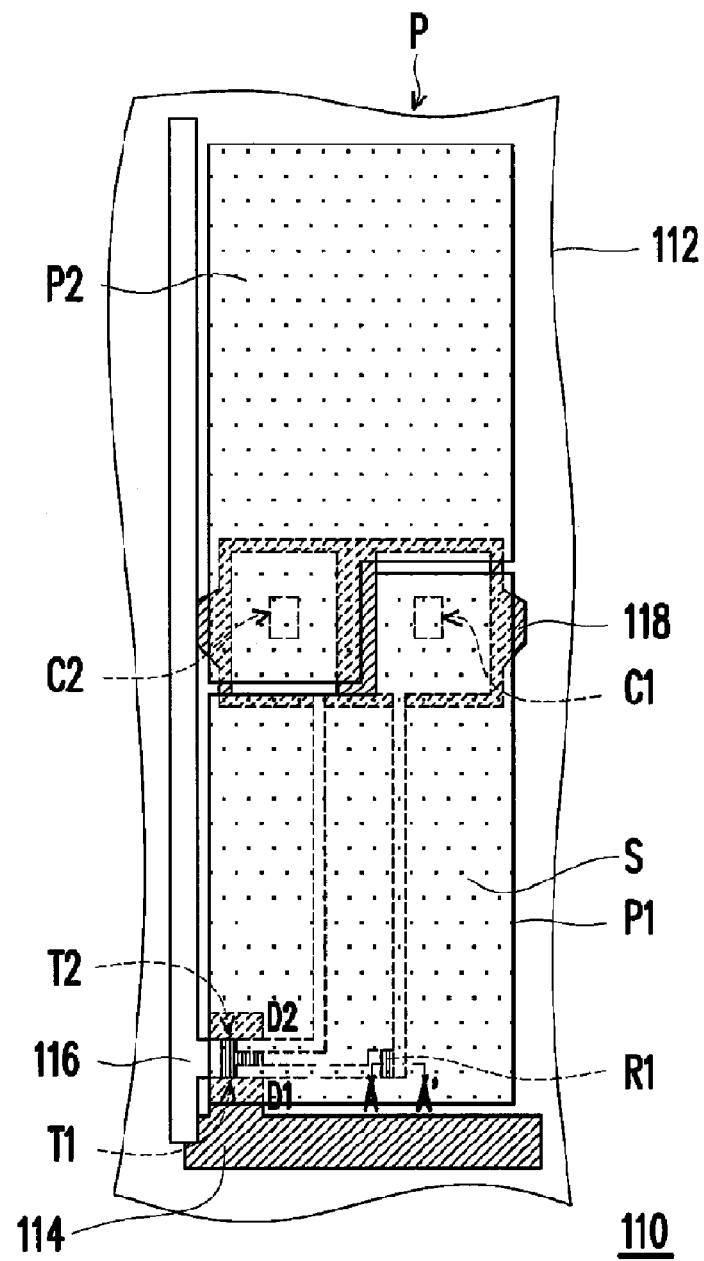
FIG. 3A is a schematic diagram for illustrating an active device array substrate according to the first embodiment of the present invention.
Figure 3B:
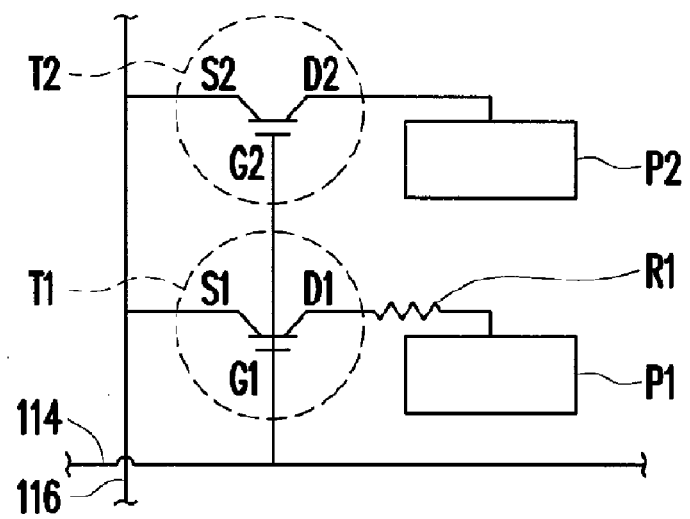
FIG. 3B is a circuit diagram of active device array substrate according to the first embodiment of the present invention.

FIG. 3A is a schematic diagram for illustrating an active device array substrate according to the first embodiment of the present invention. FIG. 3B is a circuit diagram of active device array substrate according to the first embodiment of the present invention. Referring to FIGS. 3A and 3B, the active device array substrate 110 includes a substrate 112, a plurality of scan lines 114, a plurality of data lines 116, and a plurality of pixel units P (only one is illustrated in FIG. 3A). The scan lines 114 and the data lines 116 are disposed over the substrate 112 to define positions of the pixel units P. The pixel units P are often arranged in an array on the substrate 112.

The pixel unit P as shown in FIG. 3A mainly includes a double drain active device. Referring to FIG. 3B, in the operation of the circuit, the circuit of the double drain active device is equal to the equivalent circuit of the first active device and the second active device. Of course, the pixel unit P may be selectively designed as the unit including two independent active devices. Referring to FIGS. 3A and 3B simultaneously, the pixel unit P includes a double drain active device (including the first active device and the second active device), a first pixel electrode P1, a first resistant device R1, and a second pixel electrode P2. Particularly, the first active device having the drain D1 and the second active device having the drain D2 may have the same gate and source. The first pixel electrode P1 is electrically connected to a corresponding scan line 114 and a corresponding data line 116 through the first active device T1. The second pixel electrode P2 is electrically connected to a corresponding scan line 114 and a corresponding data line 116 through the second active device T2. The first pixel electrode P1 and the second pixel electrode P2 usually overlay a common line 118 to construct a storage capacitor $C_{st}$. The common line 118 can be coupled to a reference voltage source.

It should be noted that the first resistant device R1 is electrically connected between the first active device T1 and the first pixel electrode P1. Specifically, the resistance of the first resistant device R1 is preferably within a range, e.g., $10^4$ to $10^9 \Omega$, and preferably comprised of a photosensitive material, e.g., amorphous silicon.

Figure 3C:
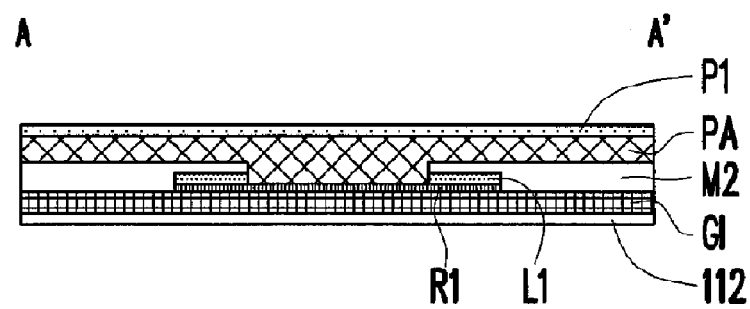
FIG. 3C is a partial cross-sectional view of FIG. 3A along line A-A'.

FIG. 3C is a partial cross-sectional view of FIG. 3A along line A-A'. Referring to FIG. 3C, in an embodiment of the present invention, a gate dielectric layer GI can be formed on the substrate 112, and the first resistant device R1 (amorphous silicon) is disposed on the gate dielectric layer GI. It should be noted that the first resistant device R1 can be fabricated together with channel layers (not shown) of respectively the first active device T1 and the second active device T2, without adding an extra mask processing step. Furthermore, a second metal layer M2 is disposed to cover both sides of the first resistant device R1. In order to decrease the resistance between the metal material and the amorphous silicon material, an ohm contact layer L1 may also be disposed between the second metal layer M2 and the first resistant device R1.

According to an object of the first embodiment, the second metal layer M2, the data lines 116, and source/drain pairs of the first active device T1 and the second active device T2 respectively are formed in a single process step. Furthermore, a passivation layer PA can be disposed to cover the first resistant device R1 and the second metal layer M2, while the first pixel electrode P1 is disposed on the passivation layer PA.

Figure 4:
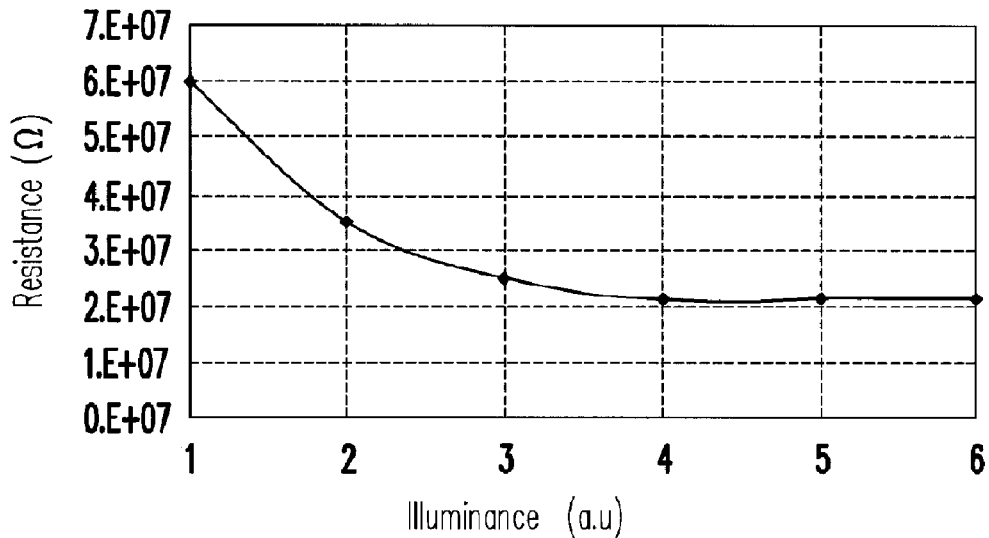
FIG. 4 is a schematic diagram showing a curve for illustrating the resistance feature of the amorphous silicon material according to the first embodiment of the present invention.

Specifically, according to an embodiment of the present invention, the preferable thinness of the amorphous layer is 1000 Å, and a length/width ratio of about 21/5. FIG. 4 shows a curve for illustrating the resistance characteristic of the amorphous silicon material according to the first embodiment of the present invention. As can be seen from the FIG. 4, resistance of the amorphous silicon material dramatically decreases when illuminated by light. After the light intensity reaches a certain value, the resistance of the amorphous material becomes stable. Such a resistance may be approximately equal to a resistance of the channel layer of the first active device T1 and the second active device T2. In practice, the light can be provided by a backlight module.

When a voltage signal is input from the data line 116 to the first pixel electrode P1 and the second pixel electrode P2, the first resistant device R1 causes the first pixel electrode P1 to have less charges charged than that of the second pixel electrode P2. As such, a charging ratio of the first pixel electrode P1 is lower than the second pixel electrode P2. Accordingly, liquid crystal molecules corresponding to a single pixel unit P are driven by two different strengths electric field, thus these liquid crystal molecules are driven to exhibit different oblique degrees.

Taking a 14 inches LCD panel 100 having a resolution of 1024×768 as an example, when the active devices have a gate-source voltage $V_{gs}$=25V, and a drain-source $V_{ds}$=10V, a conducting current $I_{on}$=1.806 µA, and a sum of the storage capacitance $C_{st}$ and a liquid crystal capacitance $C_{lc}$ equal to 0.4768 pF, and the response time $T_{on}$=21 µs:

operation load $R=R_{on}=V_{ds}/I_{on}$=10/1.806=5.537 MΩ delay time $\tau=R_{on}\times(C_{st}+C_{lc})$=5.537×0.4768=2.64 µs $$\text{Charging Ratio} = \sqrt{\frac{1-e^{-\frac{21u}{2.64u}}}{1+e^{-\frac{21u}{2.64u}}}} = 99.96\%$$

According to the above conditions, the charging ratio is 99.96%. If a resistance Rs is applied between the active device and the pixel electrode, for example Rs=23.52MΩ:

operation load $R=R_{on}+Rs$=5.537+23.52=10/ 1.806=29.057 MΩ delay time $\tau=R\times(C_{st}+C_{lc})$=29.057×0.4768=13.854 µs $$\text{Charging Ratio} = \sqrt{\frac{1-e^{-\frac{21u}{13.854u}}}{1+e^{-\frac{21u}{13.854u}}}} = 79.99\%$$

Figure 5:
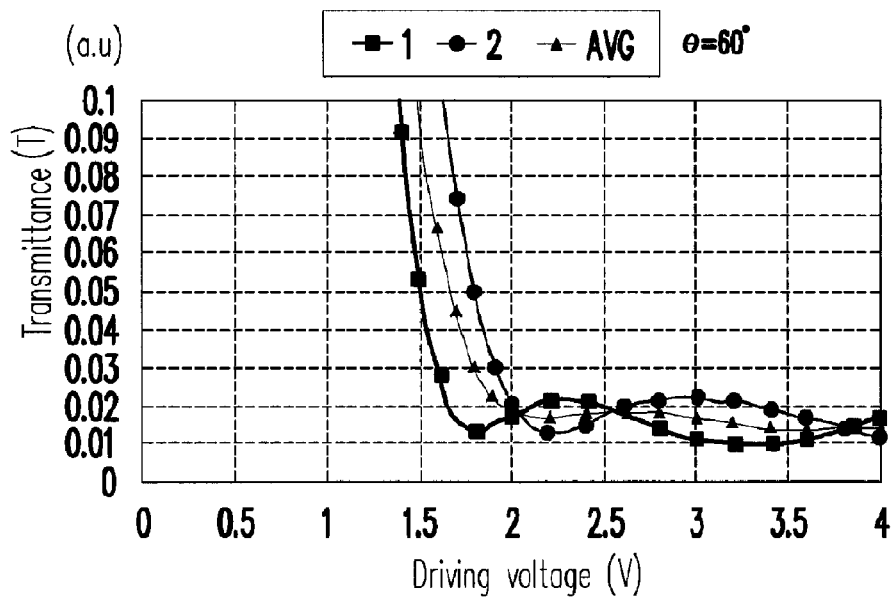
FIG. 5 shows schematic diagrams according to the first embodiment of the present invention illustrating a relationship between the driving voltage and the transmittance, when viewed at a viewing angle θ=60°.

In such a way, the charging ratio becomes 79.99%. Therefore, the charging ratio of the pixel electrode can be adjusted according to practical demands. In this way, the charging ratio of the first pixel electrode P1 can be adjusted to about 80% of the charging ratio of the second pixel electrode P2. Referring to FIG. 5, curve 1 is a characteristic diagram showing relationship between voltage and transmittance corresponding to the area of the first pixel electrode P1, and curve 2 is a characteristic diagram showing relationship between voltage and transmittance corresponding to the area of the second pixel electrode P2. By compensating each other, the curves 1 and 2 can obtain a relatively flat averaging curve AVG. In other words, when a viewer views the images from an oblique angle about 0° to 60°, the problem of inversely increasing transmittance may be effectively reduced when the driving voltage increase as in the case of the conventional art.

Figure 6:
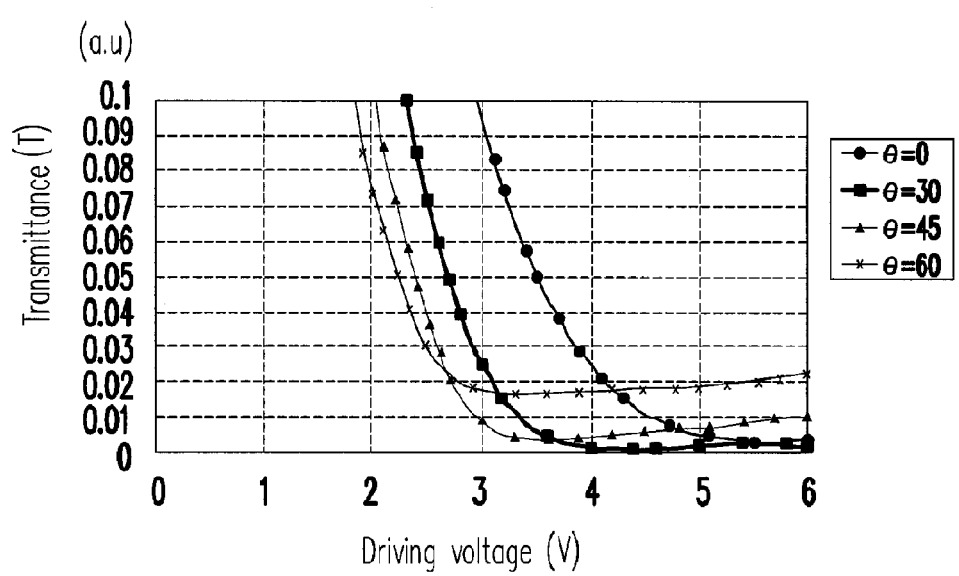
FIG. 6 is a diagram showing average curves for illustrating relationships between driving voltages and transmittances of each respective view angle.

FIG. 6 is a diagram showing average curves for illustrating relationships between driving voltages and transmittances of each respective view angle. Referring to FIG. 6, it is shown that each of averaging curves corresponding to respective oblique viewing angles, θ=30°, 45°, 60° is relatively flatter. Therefore, the viewing effect similar to the frontal view can be achieved regardless of the viewer viewing angle. As such, the displaying quality can be effectively promoted.

Figure 7:
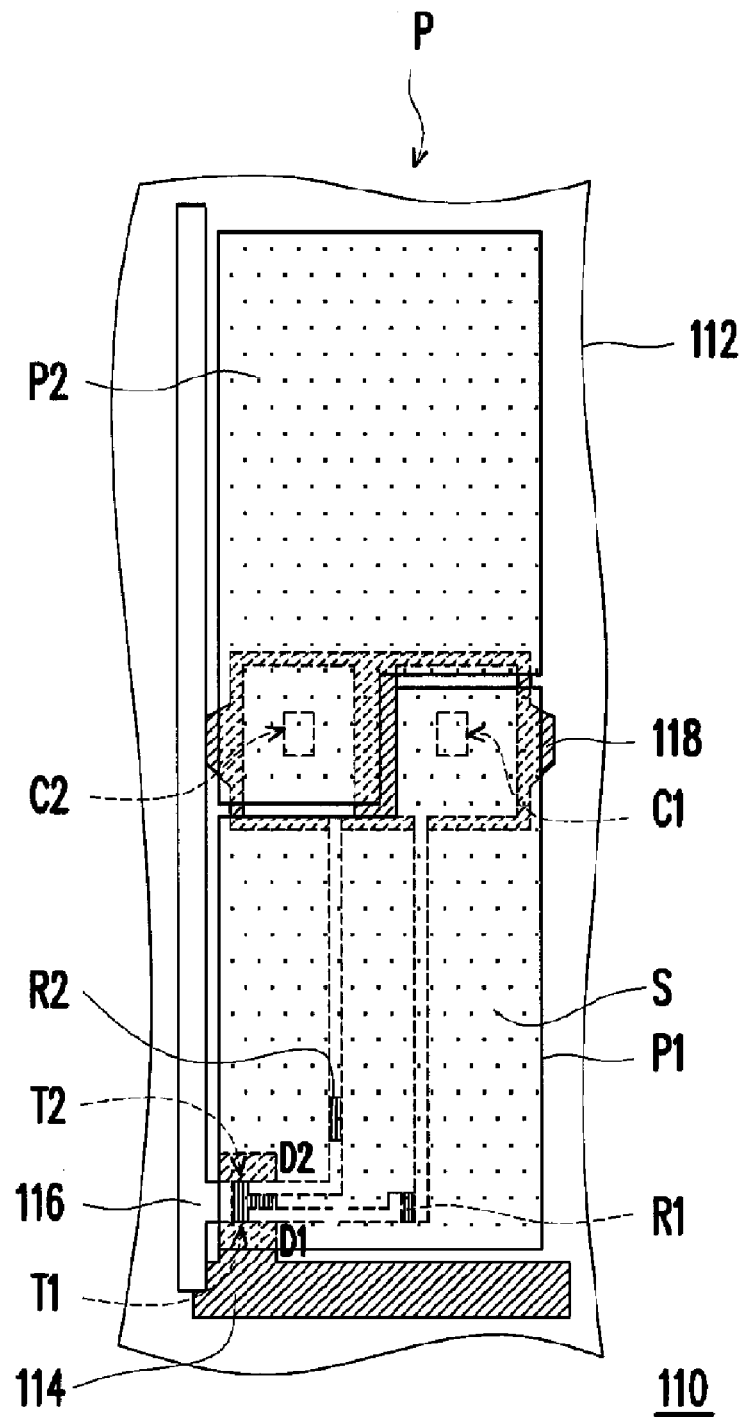
FIG. 7 is a schematic diagram for illustrating another active device array substrate according to the first embodiment of the present invention.

FIG. 7 is a schematic diagram for illustrating another active device array substrate according to the first embodiment of the present invention. Referring to FIG. 7, the active device array substrate 110 can further include a second resistant device R2. The second resistant device R2 is electrically connected between the second pixel electrode P2 and the second active device T2. In this way, first pixel electrode P1 and second pixel electrode P2 having different charging ratios can also be obtained.

Figure 8A:
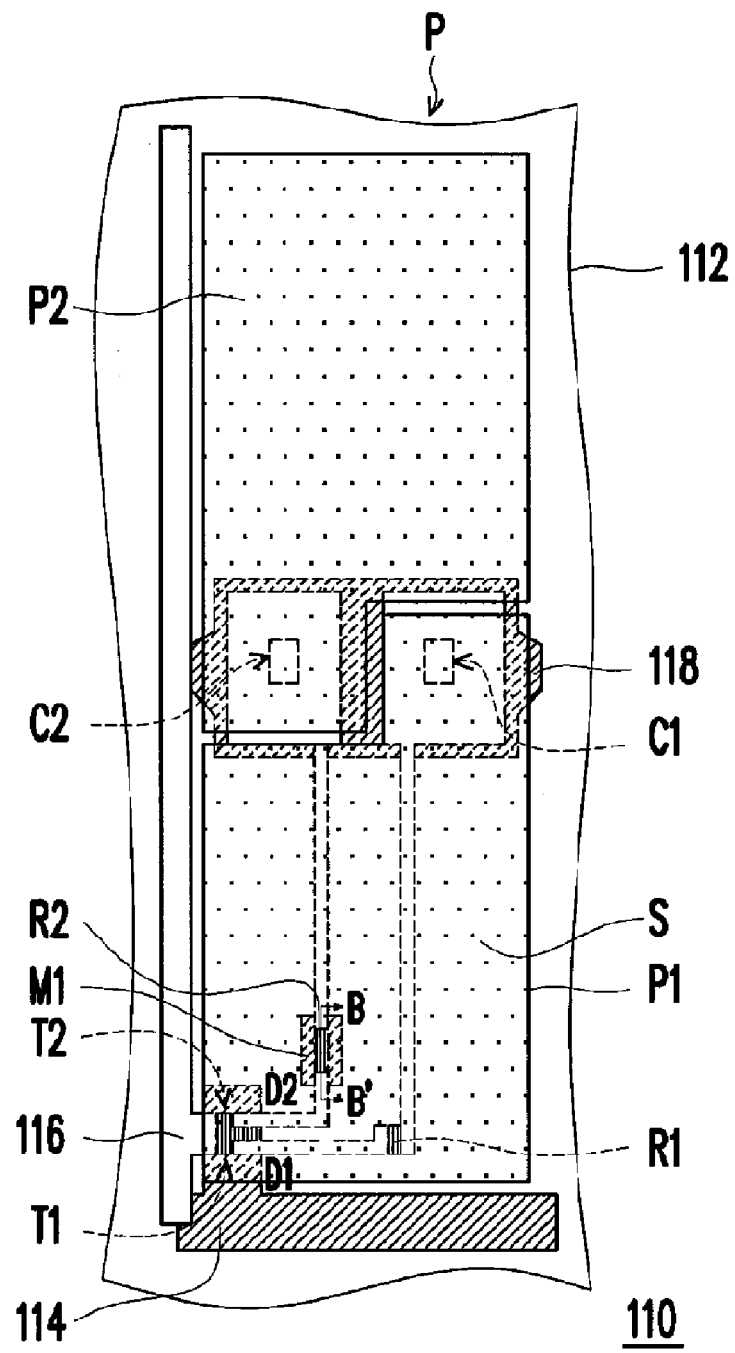
FIG. 8A is a schematic diagram for illustrating a shielding metal layer according to the first embodiment of the present invention.

FIG. 8A is a schematic diagram for illustrating a shielding metal layer according to the first embodiment of the present invention. Referring to FIG. 8A, for further adjusting the transmittances of the first pixel electrode P1 and the second pixel electrode P2, the active device array substrate 110 according to the present invention further includes a shielding metal layer M1 disposed under the second resistant device R2. The shielding metal layer M1 is adapted for shielding light from a backlight module (not shown), thus avoiding the second resistant device R2 from being illuminated. Therefore, the second resistant device R2 has a resistance higher than that of the first resistant device R1. Therefore, the first pixel electrode P1 and the second pixel electrode P2 having different charging ratios can also be obtained.

Figure 8B:
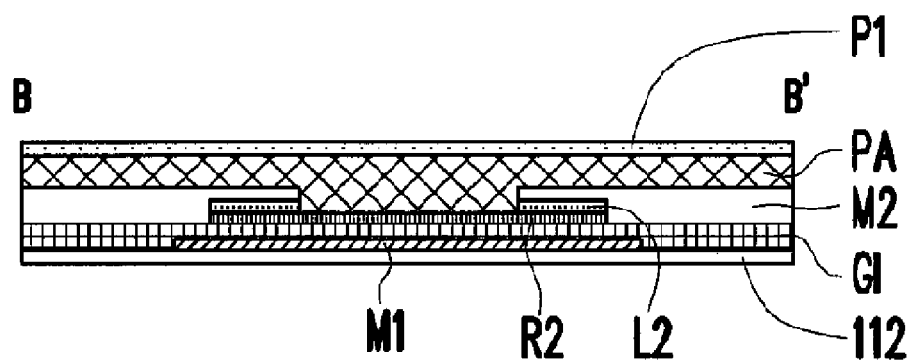
FIG. 8B is a partial cross-sectional view of FIG. 8A along line B-B'.

FIG. 8B is a partial cross-sectional view of FIG. 8A along line B-B'. Referring to FIG. 8B, according to an embodiment of the present invention, the shielding metal layer M1 is disposed on the substrate 112. It should be noted that the shielding metal layer M1 can be fabricated together with the scan line 114, a gate GI of the first active device T1, a gate G2 of the second active device T2, and the common line 118, without an additional mask processing step. Moreover, the gate dielectric layer GI covers the shielding metal layer M1, while the second shielding metal layer M2 is disposed at both sides of the second resistant device R2. An ohm contact layer L2 is disposed between the second shielding metal layer M2 and the second resistant device R2. The passivation layer PA covers the second resistant device R2 and the second shielding metal layer M2, while the first pixel electrode P1 is configured on the passivation layer PA.

Second Embodiment

Figure 9A:
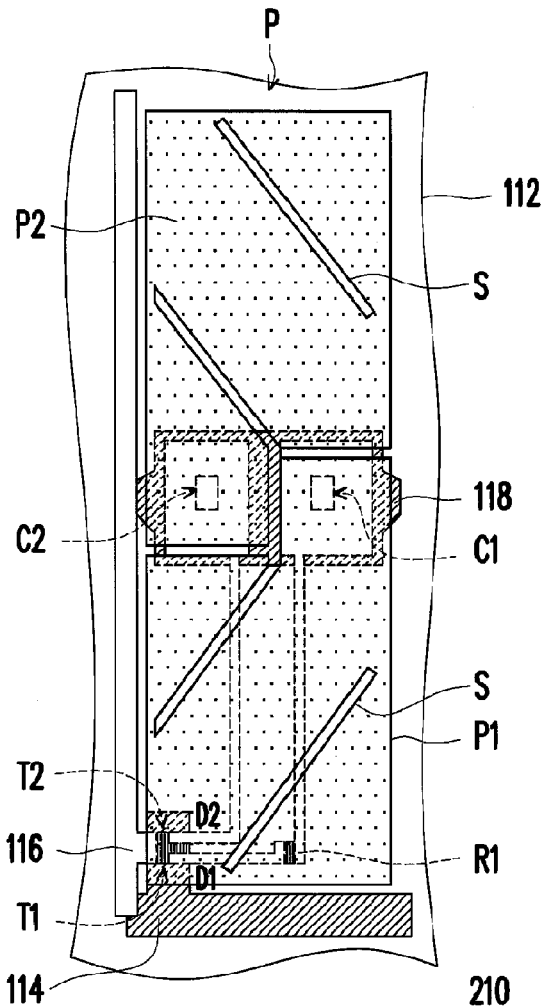
FIG. 9A is a schematic diagram for illustrating an active device array substrate according to a second embodiment of the present invention.
Figure 9B:
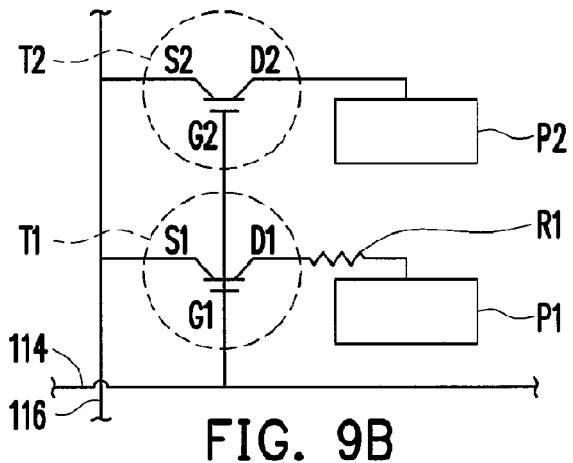
FIG. 9B is a circuit diagram of active device array substrate according to the second embodiment of the present invention.

FIG. 9A is a schematic diagram for illustrating an active device array substrate according to a second embodiment of the present invention. FIG. 9B is a circuit diagram of active device array substrate according to the second embodiment of the present invention. The active device array substrate 210 described therein is similar to the active device array substrate 110 according to the first embodiment of the present invention, the main difference between them is that: the active device array substrate 210 is adapted for a VA LCD panels, including multi-domain vertically alignment (MVA) LCD panels, and patterned vertical alignment (PVA) LCD panels.

Taking an MVA LCD panel as an example, the active device array substrate 210 is illustrated in details. In order to have the liquid crystal molecules arranged in multi-directions for the purpose of obtaining a wider viewing angle, many slits S as shown in FIG. 9A are formed on the first pixel electrode P1 and the second pixel electrode P2. Further, the first resistant device R1 is electrically connected between the first active device T1 and the first pixel electrode P1. As such, a charging ratio of the first pixel electrode P1 can be adjusted to some degree to differ from the charging ratio of the second pixel electrode P2, e.g., the charging ratio of the first pixel electrode P1 is adjusted to 85% of the charging ratio of the second pixel device P2.

Figure 10:
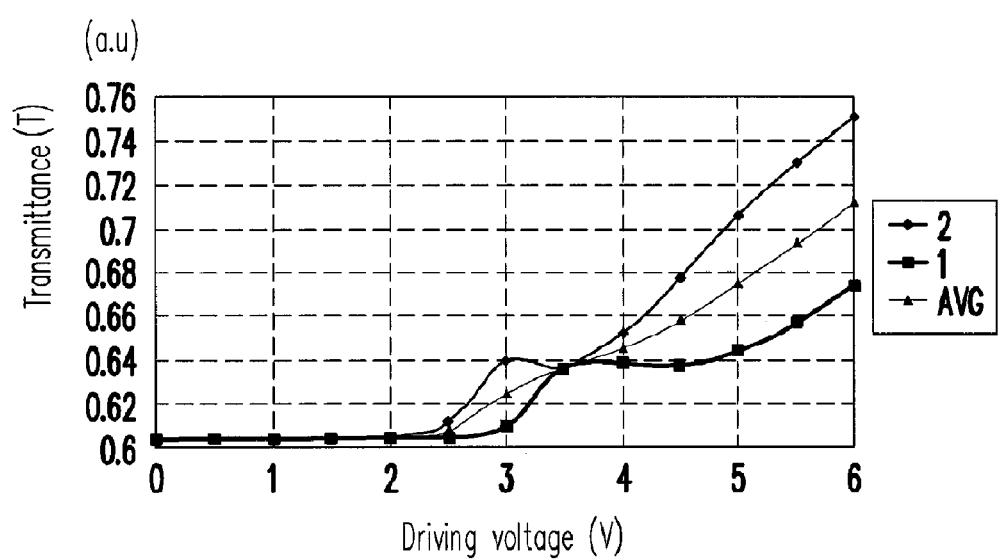
FIG. 10 is a schematic diagram according to the second embodiment of the present invention, illustrating a relationship between driving voltage and transmittance, when viewed at a viewing angle θ=60°.

Referring to FIG. 10, the curve 1 is a characteristic diagram showing relationship between the voltage and the transmittance corresponding to the area of the first pixel electrode P1, and the curve 2 is a characteristic diagram showing relationship between the voltage and the transmittance corresponding to the area of the second pixel electrode P2. By compensating each other, the curves 1 and 2 can obtain a relatively flat averaging curve AVG. In other words, the problem of color shift at the viewing angle of θ=60° can be effectively reduced, and thus displaying quality can be improved.

Figure 11:
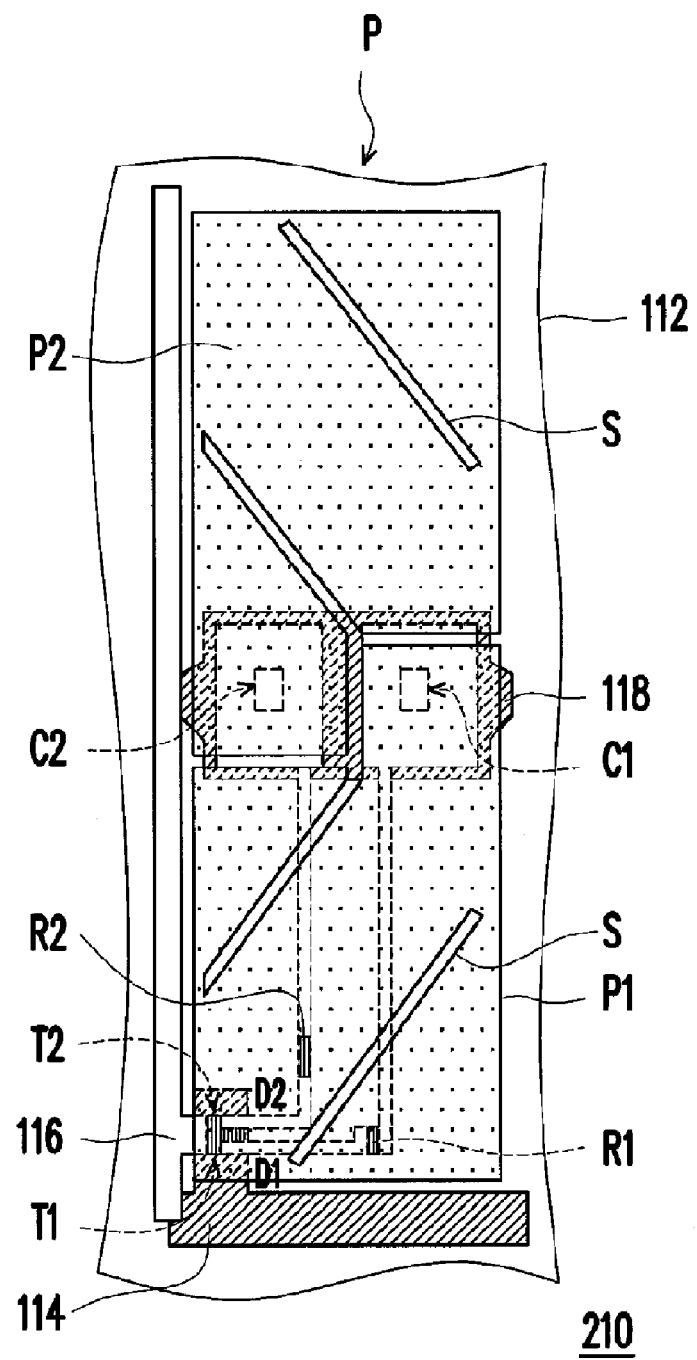
FIG. 11 is a schematic diagram for illustrating another active device array substrate according to the second embodiment of the present invention.

FIG. 11 is a schematic diagram for illustrating another active device array substrate according to the second embodiment of the present invention. Referring to FIG. 11, the active device array substrate 210 can further include a second resistant device R2. The second resistant device R2 is electrically connected between the second pixel electrode P2 and the second active device T2. In this way, first pixel electrode P1 and second pixel electrode P2 having charging ratios different from each other can also be obtained.

Figure 12:
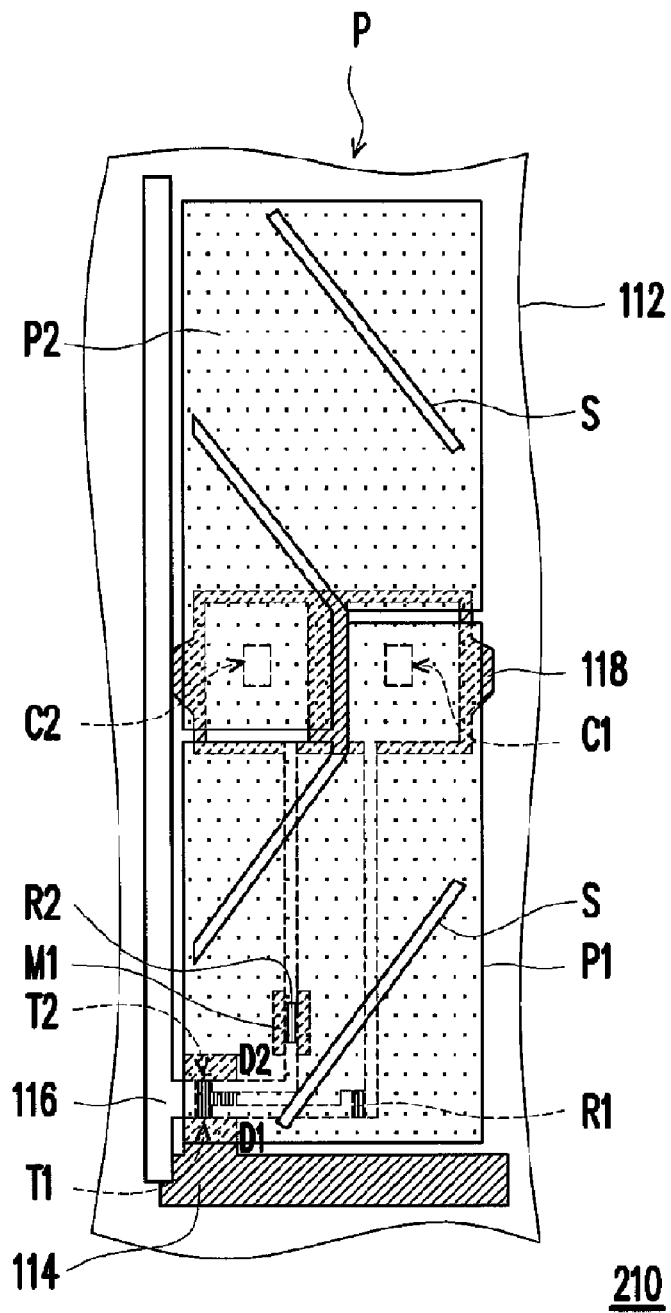
FIG. 12 is a schematic diagram for illustrating a shielding metal layer according to the first embodiment of the present invention.

FIG. 12 is a schematic diagram for illustrating a shielding metal layer according to the first embodiment of the present invention. Referring to FIG. 12, for further adjusting the transmittances of respective the first pixel electrode P1 and the second pixel electrode P2, the active device array substrate 210 according to the present invention further includes a shielding metal layer M1 disposed under the second resistant device R2. The shielding metal layer M1 is adapted for shielding light from a backlight module (not shown), thus avoiding the second resistant device R2 from being illuminated. Therefore, the second resistant device R2 has a resistance higher than that of the first resistant device R1 that is being illuminated. Therefore, the first pixel electrode P1 and the second pixel electrode P2 having different charging ratios can also be obtained.

Third Embodiment

Figure 13:
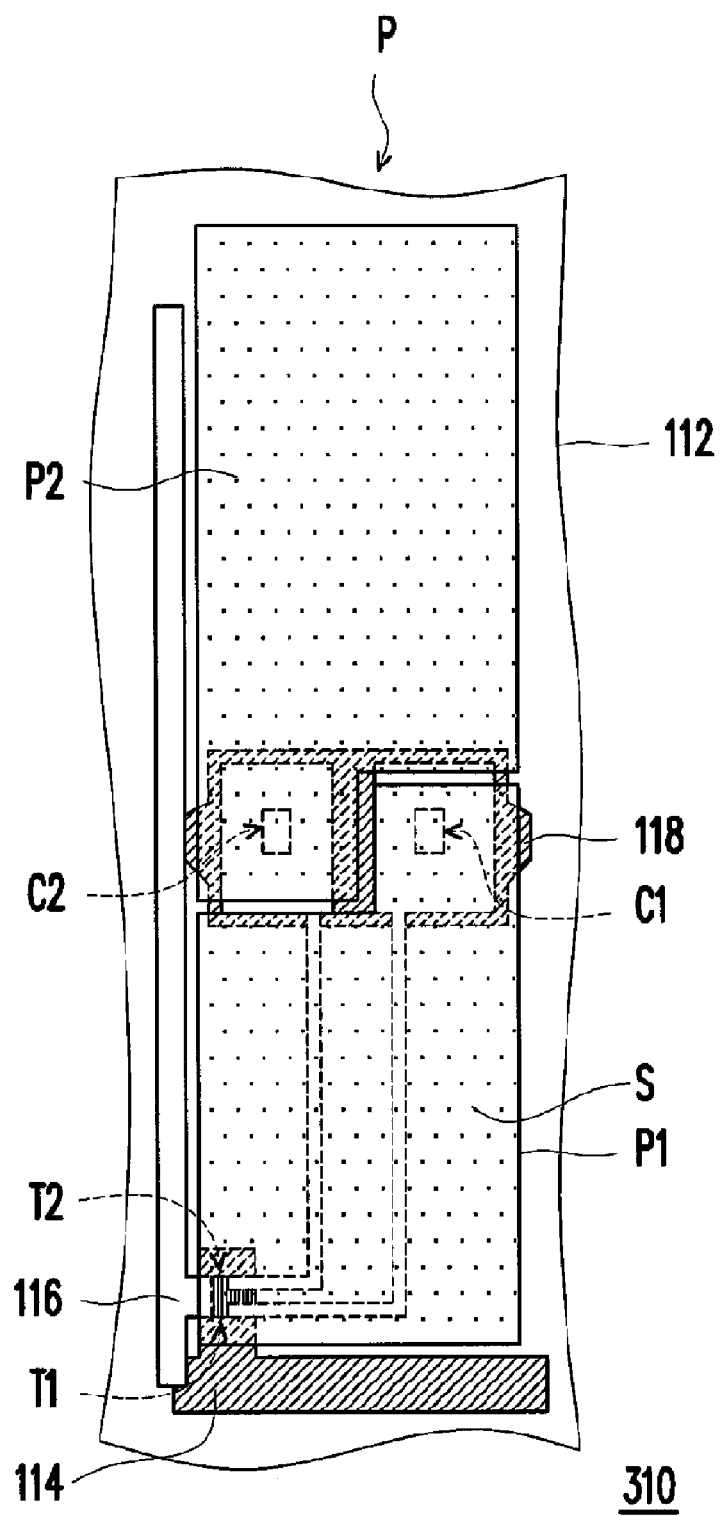
FIG. 13 is a schematic diagram for illustrating an active device array substrate according to a third embodiment of the present invention.

An LCD panel according to the third embodiment of the present invention is illustrated below. The LCD panel according to the third embodiment is similar to the LCD panel of the first embodiment of the present invention, the main difference between them is that: the areas of the first pixel electrode and the second pixel electrode are different, and it is unnecessary to dispose a first resistant device and a second resistant device as disclosed in the first embodiment. Of course, such a first resistant device and second resistant device can be optionally disposed on the substrate, and it is not intended to limit the scope of the present invention. FIG. 13 is a schematic diagram for illustrating an active device array substrate 310 according to the third embodiment of the present invention. Referring to FIG. 13, a first pixel electrode P1 has an area 0.2 to 0.8 times that of the second pixel electrode P2. In such a way, charging ratios of the first pixel electrode P1 and the second pixel electrode P2 are different from each other.

In summary, the present invention provides an active device array substrate. The active device array substrate may have a first pixel electrode and a second pixel electrode having different surface areas. Alternatively, the active device array substrate may employ a first resistant device disposed on the substrate and electrically connected between the first active device and the first pixel electrode. Therefore, the first pixel electrode and the second pixel electrode have different voltages after being charged such that the transmittances corresponding to the first pixel electrode and the second pixel electrode respectively can be different. Thus, two different transmittances can compensate one to another such that a viewing effect similar to a frontal view can be achieved regardless of viewing angles through. Accordingly, the LCD panel according to the present invention has a better displaying quality. Alternatively, a second resistant device, and a shielding metal layer under the second resistant device may also be employed to adjust the charging ratios of the first pixel electrode and second pixel electrode.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An active device array substrate, comprising:
   a substrate;
   a plurality of scan lines, disposed over the substrate;
   a plurality of data lines, disposed over the substrate; and
   a plurality of pixel units, disposed over the substrate, each of the pixel units formed between every neighboring two of the scan lines and data lines, and each of the pixel units comprising:
   a first active device;
   a first pixel electrode, electrically connected to a corresponding scan line and a corresponding data line through the first active device;
   a second active device; and
   a second pixel electrode, electrically connected to the corresponding scan line and the corresponding data line through the second active device, wherein the first pixel electrode has a surface area different from that of the second pixel electrode.

2. An liquid crystal display panel, comprising:
   the active device array substrate as claimed in claim 1;
   an opposite substrate, disposed over the active device array substrate; and
   a liquid crystal layer, disposed between the active device array substrate and the opposite substrate.

3. The liquid crystal display panel of claim 2, wherein the opposite substrate is a color filter substrate.

* * * * *